United States Patent [19]

Takahara et al.

[11] Patent Number: 5,832,217
[45] Date of Patent: Nov. 3, 1998

[54] COMMUNICATION SYSTEM DISTRIBUTING PACKETS ACCORDING TO COMMANDS ACQUIRED FORM PACKETS AND FILTERING REAL TIME REQUESTS FROM THE ACCEPTED REQUESTS AND PROCESSING THE REALTIME REQUESTS SELECTED BY THE FILTER

[75] Inventors: Keiko Takahara, Kawasaki; Naoko Iwami, Machida; Kazuma Yumoto, Hachiohji; Susumu Matsui, Machida, all of Japan

[73] Assignee: Hitachi, Ltd., Tokyo, Japan

[21] Appl. No.: 617,651

[22] Filed: Mar. 15, 1996

[30] Foreign Application Priority Data

Mar. 15, 1995 [JP] Japan .................................. 7-055512

[51] Int. Cl.$^6$ ...................................................... G06F 15/16
[52] U.S. Cl. .................................. 395/200.3; 395/200.54
[58] Field of Search ..................... 395/200.53, 200.54, 395/200.55, 200.57, 232, 609, 348, 838, 200.3, 200.32; 379/201, 142, 67, 93.01

[56] References Cited

U.S. PATENT DOCUMENTS

| | | | |
|---|---|---|---|
| 5,394,445 | 2/1995 | Ball et al. .................................. | 379/67 |
| 5,546,448 | 8/1996 | Caswell et al. .......................... | 379/142 |
| 5,604,791 | 2/1997 | Lee ............................................. | 379/67 |
| 5,646,839 | 7/1997 | Katz ....................................... | 379/93.01 |
| 5,655,015 | 8/1997 | Walsh et al. ............................. | 379/201 |

OTHER PUBLICATIONS

*Intel ProShare 200.*
*ShareVision PC3000*, Creative Labs.
*Hitachi Review*, Personal Multimedia Communication Systems, T. Koyama, et al., vol. 44, (1995), No. 4.

*Primary Examiner*—Mehmet B. Geckil
*Attorney, Agent, or Firm*—Antonelli, Terry, Stout & Kraus, LLP

[57] ABSTRACT

A communication system having a plurality of communication terminals which perform data communication with each other through a communication network. Each communication terminal includes a refusing time zone registration unit for registering a time zone in which the communication terminal will not accept a communication request from the other communication terminals, a present time acquisition unit for acquiring a present time when a communication request is received from a communication request transmitting terminal, and a judgment unit for judging whether the communication request has been received during the registered time zone by comparing the acquired present time to the registered time zone. The communication terminal further includes a communication refusing signal issuance unit for issuing a communication refusing signal automatically to the communication request transmitting terminal when it is judged that the communication request has been received during the registered time zone.

72 Claims, 13 Drawing Sheets

FIG. 10
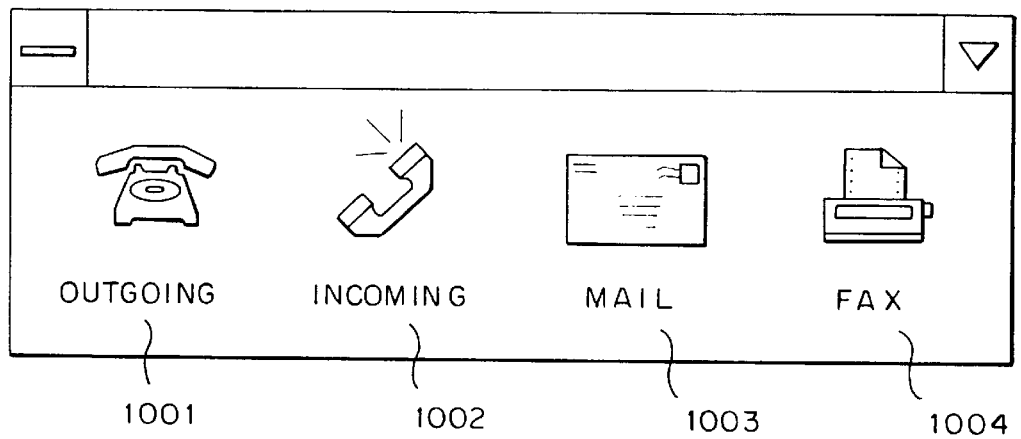
FIG. 11
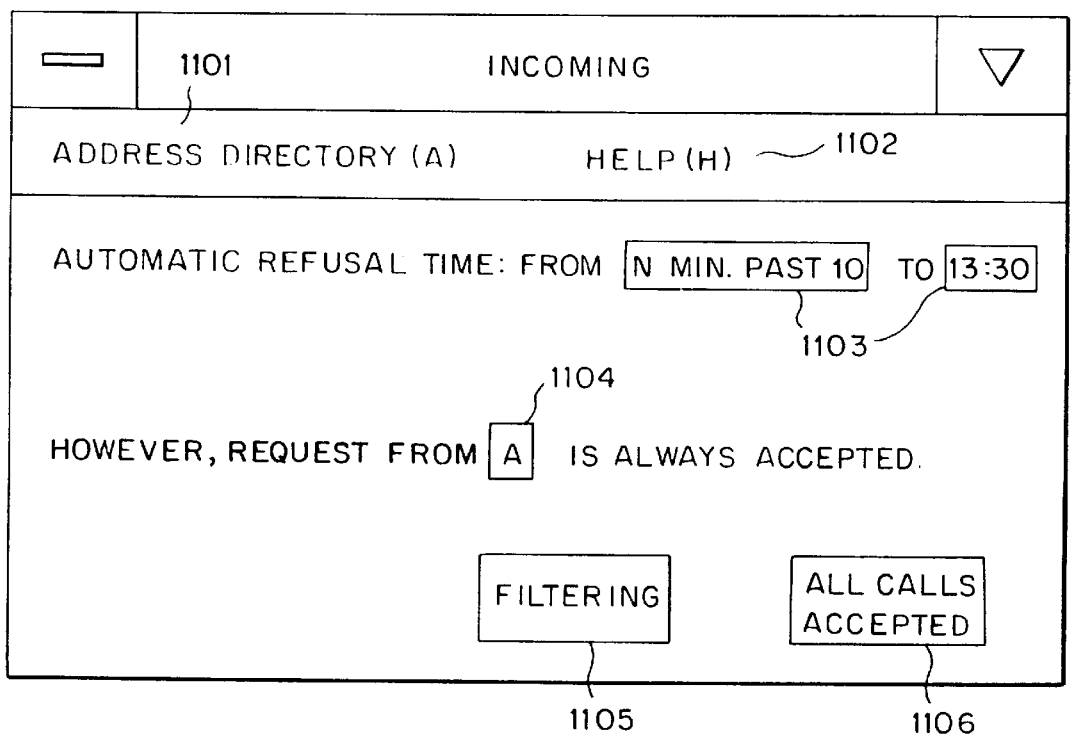
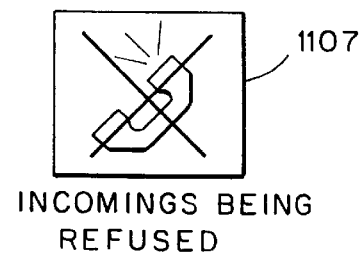
INCOMINGS BEING REFUSED

F I G. 14
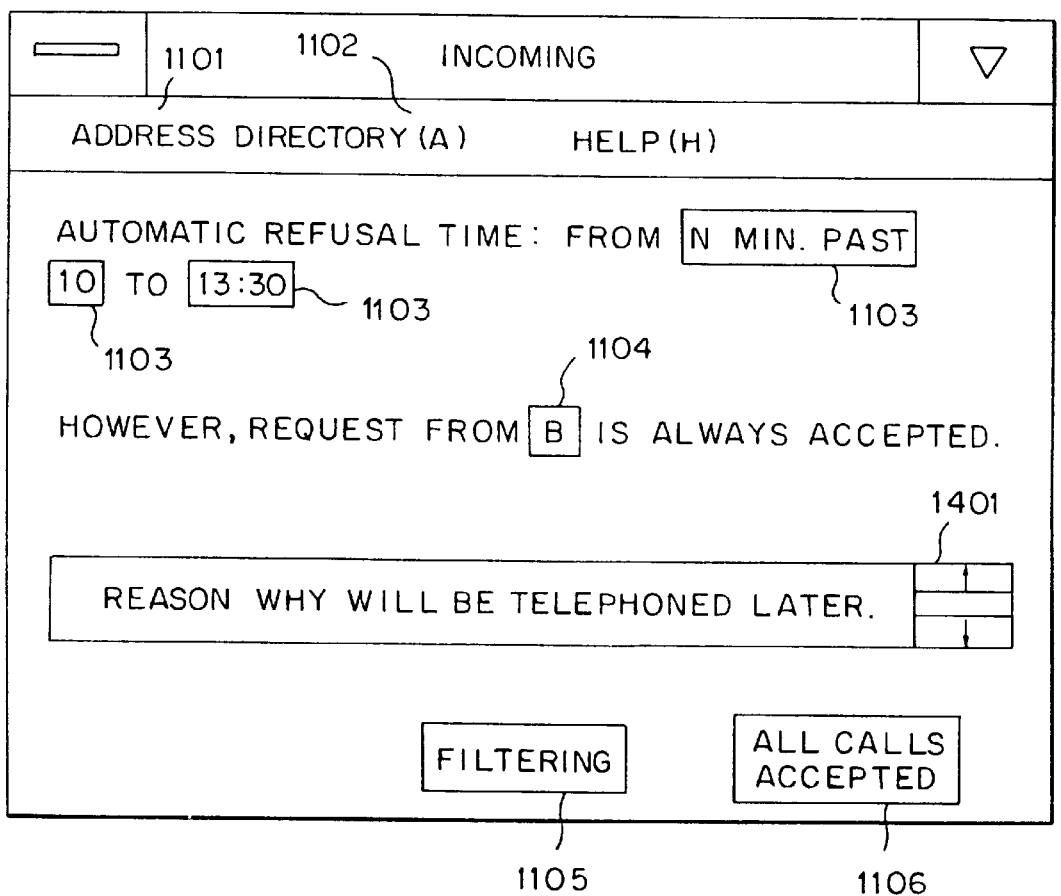

COMMUNICATION SYSTEM DISTRIBUTING PACKETS ACCORDING TO COMMANDS ACQUIRED FORM PACKETS AND FILTERING REAL TIME REQUESTS FROM THE ACCEPTED REQUESTS AND PROCESSING THE REALTIME REQUESTS SELECTED BY THE FILTER

BACKGROUND OF THE INVENTION

The present invention relates to a communication system having a plurality of terminals which perform communication through a communication network. More particularly, the present invention relates to a communication system having a plurality of terminals each of which can automatically set a time zone to reject incoming communication requests.

In a conventional communication system through a communication network, when a real time communication request arrives, the transmitting terminal is not known until communication is commenced. Thus, a call from an undesirable person or a call during a busy time zone has to be accepted. A system, which addresses this problem, is disclosed, for example, in Japanese Patent Laid-Open No. Hei 7-115469. In this reference, a voice communication system is described in which it is arranged that a person on the transmitting side can be known to a person on the receiving side and the reason a call is refused can be known to the person on the transmitting side by displaying the name and the address of the transmitter and the reason of refusal of communication by the receiver. In the voice communication system described in the reference, if a receiving task is being activated, when a request for real time communication is received, a user is informed of the fact every time such a request has been received thereby causing numerous interruptions.

In the conventional communication system as described in the above-noted reference, when a request for real time communication is received, the user on the incoming side is informed of all communication requests. Thus, the user while working on the terminal can be interrupted with voices or pictures at any time, thereby causing a problem that a worker is forced to interrupt his/her work.

SUMMARY OF THE INVENTION

An object of the present invention is to solve the above-described problems associated with conventional communication systems by providing a communication system and method therefore that can automatically refuse a real time communication request by filtering incoming requests on the incoming side.

Another object of the present invention is to provide a communication system and a method performed by the system in which when the system is made to automatically refuse a real time communication request according to a registered refusing time zone, persons whose communication request is to be refused is informed of the reason the communication request is refused.

Yet another object of the present invention is to provide a communication system and a method performed by the system in which when the system refuses a communication request based on a registered refusing time zone, the time of receipt of the communication request and the address of the communication terminal which transmitted the communication request is registered in a storage device for later use.

Still yet another object of the present invention is to provide a communication system and a method performed by the system in which when a communication request is received during a refusing time zone, the communication request is not refused if the person transmitting the communication request corresponds to one of the persons registered as being a person whose communication request is always accepted even during the refusing time zone.

In order to achieve the above-described objects, the present invention provides a communication system which includes a plurality of communication terminals connected to a communication network. Each of the communication terminals includes refusing time zone registration apparatus for registering a time zone in which a real time communication request from the other communication terminals connected to the communication network are not accepted, present time acquisition apparatus for acquiring a present time when a communication request is received, judgment apparatus for judging whether a communication request has been received in the time zone which is registered in the refusing time zone registration apparatus by comparing the present time of the communication request being acquired by the present time acquisition apparatus and the time zone registered in the refusing time zone registration apparatus, and a communication refusing signal issuance apparatus for issuing a communication refusing signal automatically to the communication request transmitting terminal, when it is judged by the judgment apparatus that the real time communication request has been received in the time zone which is registered in the refusing time zone registration apparatus.

A communication permitted terminal registration apparatus which registers information about a terminal to communicate with whose communication request is always accepted is further provided and apparatus for informing a user using a communication terminal on the incoming side of the communication request transmitted from a communication terminal registered in the communication permitted terminal registration apparatus out of real time communication requests which have been received during the registered time zone.

Further there are provided three more apparatuses operative when the system automatically refuses a communication request which has been received in the time zone registered in the refusing time zone registration apparatus. A first apparatus is provided for registering the reason the communication request is not accepted. A second apparatus is provided for informing the communication terminal which transmitted the communication request of the reason the communication request is refused. A third apparatus is provided for storing in a storage information of the identity of the communication terminal which transmitted the communication request that has been refused and the time of such refusal for later use by the communication terminal refusing the communication request.

Still further, the present invention provides apparatus for displaying an icon denoting an incoming task and a filtering button, apparatus for displaying an incoming filtering registration screen when activating the incoming task by a click of the icon denoting an incoming task, apparatus for inputting to the incoming filtering registration screen at least a refusing time zone for a real time communication request among the refusing time zone, information about a terminal to communicate with when a communication terminal whose communication request can be accepted even in the registered refusing time zone, and a reason why communication has been refused, and apparatus for displaying an icon showing that the terminal is in a refusing time zone for incoming requests thereby commencing filtering of incoming requests by a click of the filtering button. The input can be provided by direct key input or can be selected from a directory such as a telephone directory displayed on a screen being registered for private use.

The present invention alternatively provides a communication system which includes a plurality of communication terminals connected to each other by a communication network and a communication refusing terminal registration apparatus for registering information of a terminal which does not accept a real time communication request from other communication terminals connected to the communication network. Each of the communication terminals includes a judgment apparatus for judging whether a communication request transmitting terminal is registered in the communication refusing terminal registration apparatus or not when a communication request has been received, and a communication refusing signal issuance apparatus for automatically issuing a communication refusing signal to a communication request transmitting terminal when it is judged that the transmitting terminal is registered in the communication refusing terminal registration apparatus.

Further provided in the communication system is a setting apparatus. When the communication refusing signal issuance apparatus issues a communication refusing signal to a communication request transmitting terminal, the setting apparatus is able to set selectively whether a user using the incoming side terminal is to be informed of the refusing or not.

To further accomplish the above-described objects the present invention provides a communication method which operates in a communication system that includes a plurality of communication terminals connected to a communication network. Each of the communication terminals performs the steps of the communication method of registering a time zone in which a real time communication request from the other communication terminals connected to the communication network are not accepted, acquiring a present time when a communication request is received, judging whether a communication request has been received in the registered time zone by comparing the receiving time of the communication request and the registered time zone and issuing a communication refusing signal automatically to the communication request transmitting terminal when it is judged that the real time communication request has been received in the registered time zone.

The above-described communication method further includes the steps of registering information about a communication terminal to communicate with is to whether a communication request is always accepted and informing a user using the communication terminal of the communication request from a communication terminal corresponding to the communication terminal whose communication request is always accepted according to the registered information.

The above-described communication method still further includes the steps of registering a reason why a communication request is not to be accepted, informing the terminal which transmitted a communication request of the reason the communication request is refused and storing in a storage information of the identity of the terminal from which a communication request has been refused and the time of such refusal for later use by the communication terminal.

The above-described communication method also provides the steps of displaying an icon denoting an incoming task and a filtering button, displaying an incoming filter registration screen when activating the incoming task by a click of the icon denoting an incoming task, inputting to the incoming filtering registration screen at least a refusing time zone for a real time communication request among the refusing time zone, information about a terminal to communicate with when a communication terminal whose communication request can be accepted even during the registered time zone and a reason why communication has been refused and displaying an icon showing that the communication terminal is in a refusing time zone for incoming communication requests thereby commencing filtering of incoming requests by a flick of the filtering button.

The communication method of the present invention alternatively includes the steps of registering information of a communication terminal which does not accept a real time communication request from other communication terminals connected to the communication network, judging whether the transmitting terminal has been registered when a communication request from the transmitting terminal has been received and automatically issuing a communication refusing signal to the communication request transmitting terminal when it is judged that the communication request transmitting terminal has been registered.

To still further accomplish the above-described objects, the present invention provides a computer program having code sections or code which corresponds to each of the above-described steps of the above-described method. The code sections or code of the computer program corresponding to the steps of the communication method may be written in any computer language such as the C programming language. The computer program of the present invention is stored on a storage medium such as a floppy disk or the like which is readable by a computer or computer work station which forms each of the communication terminals. The computer program includes various code sections and codes which when executed by the communication terminals causes the communication terminals to perform functions corresponding to the above-described steps of the method of the present invention.

In the present invention when a communication request is received, information can be provided indicating that the incoming side terminal will not accept the communication request or indicating the reason of refusal to the communication request transmitter, without informing the user of the incoming side terminal, based on filtering information. Filtering information such as a time zone in which the user on the incoming side will not accept a real time communication request and the reason thereof, and a terminal whose request can be always accepted even when the request is received in the refusing time zone can be registered.

In the filtering performed for real time communication requests, filtering information such as a time zone for filtering incoming requests, a terminal whose communication request can be accepted even when received in the refusing time zone, and a reason the communication request is refused can be easily requested by following instructions on the display screen of the terminal.

Further a communication request from a person deemed undesirable to conduct communication with can be automatically refused or the receiver on the incoming side can freely set as to whether the incoming side is informed of the automatic refusing or not.

BRIEF DESCRIPTION OF THE DRAWINGS

The present invention will be more apparent from the following detailed description, when taken in conjunction with the accompanying drawings, in which:

FIG. 10 shows a main screen of the present communication system;

FIG. 11 shows a screen in an incoming terminal which performs the registration of automatic refusing, which is displayed when an incoming task shown in FIG. 10 is activated;

FIG. 14 shows a display screen on the incoming side in a case where the reason of automatic refusing as shown in FIG. 11 is registered.

DETAILED DESCRIPTION OF PREFERRED EMBODIMENTS

A first embodiment according to the present invention will be explained in detail using FIG. 1 to FIG. 6. In the first embodiment, an automatic refusing time zone (filtering time) is registered beforehand and all communication requests in the time zone are refused.

Figure 1:
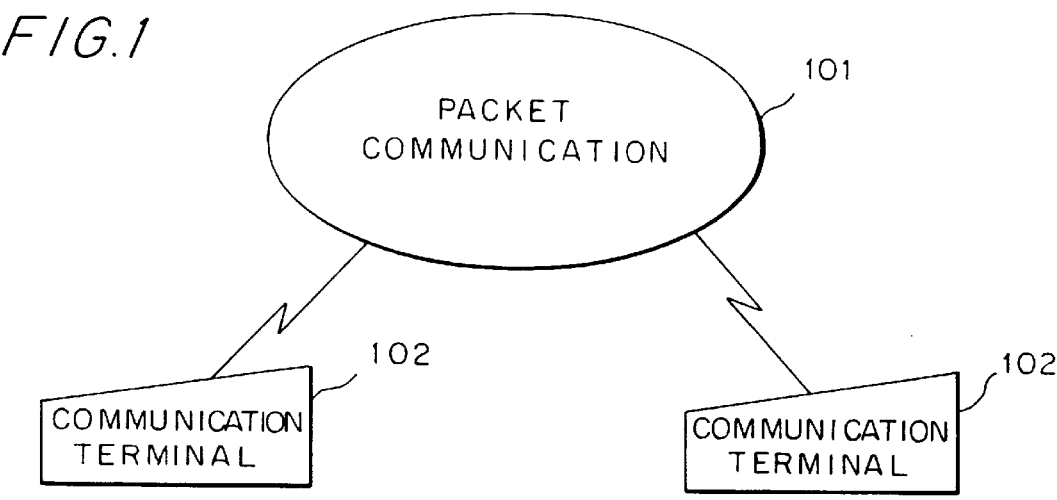
FIG. 1 is a block diagram of a communication system for executing the present invention.

FIG. 1 is a block diagram of a communication system for executing the first embodiment according to the present invention. In FIG. 1., 101 denotes a packet communication network, and 102 denote communication terminals which communicate with each other through the packet communication network.

Figure 2:
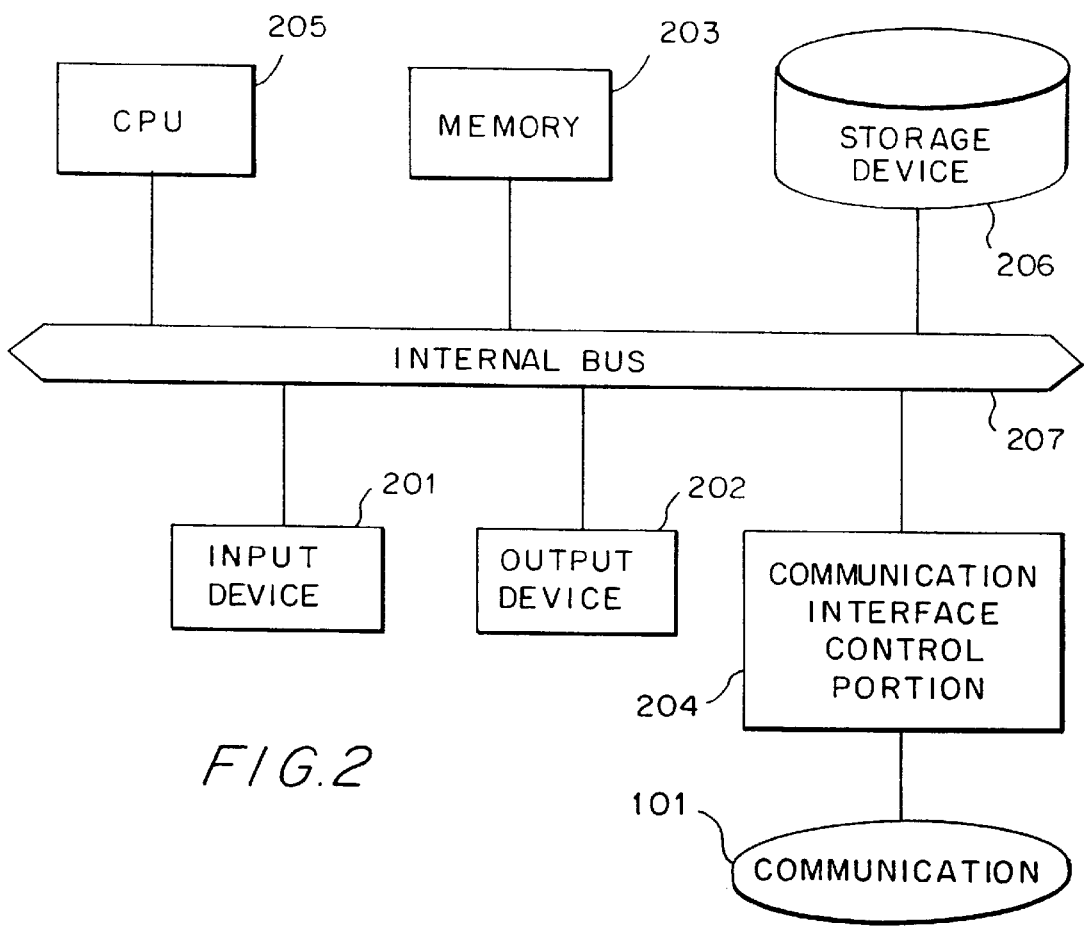
FIG. 2 is a block diagram of a communication terminal for executing the present invention.

FIG. 2 shows an example of the internal construction of the communication terminal 102 shown in FIG. 1. In FIG. 2, 201 is an input device for inputting various kinds of information such as audio, visual, digital data, character data, etc. 202 is an output device for outputting various kinds of information such as audio, visual, digital data, character data, etc. 203 is a memory for storing a communication program etc. 204 is a communication network interface control portion for performing an interface process of the communication network. 205 is a CPU for performing communication control of respective media such as data communication, audio communication, video communication, etc. 206 is an storage device being constructed with a magnetic disc etc. for storing filtering information of incoming communication requests or private address directory set by a user. 207 is an internal bus of a communication terminal.

The communication terminal 102 illustrated in FIG. 2 may be constructed of a personal computer (PC) or a workstation type computer. The features of the present invention as described below may be embodied in a computer program executable by the communication terminal 102. The computer program may be written in a computer programming language such as the C programming language and may be recorded onto a storage medium readable by the communication terminal 102 such as a floppy disk or made a part of the communication terminal 102 by ROM.

Figure 3:
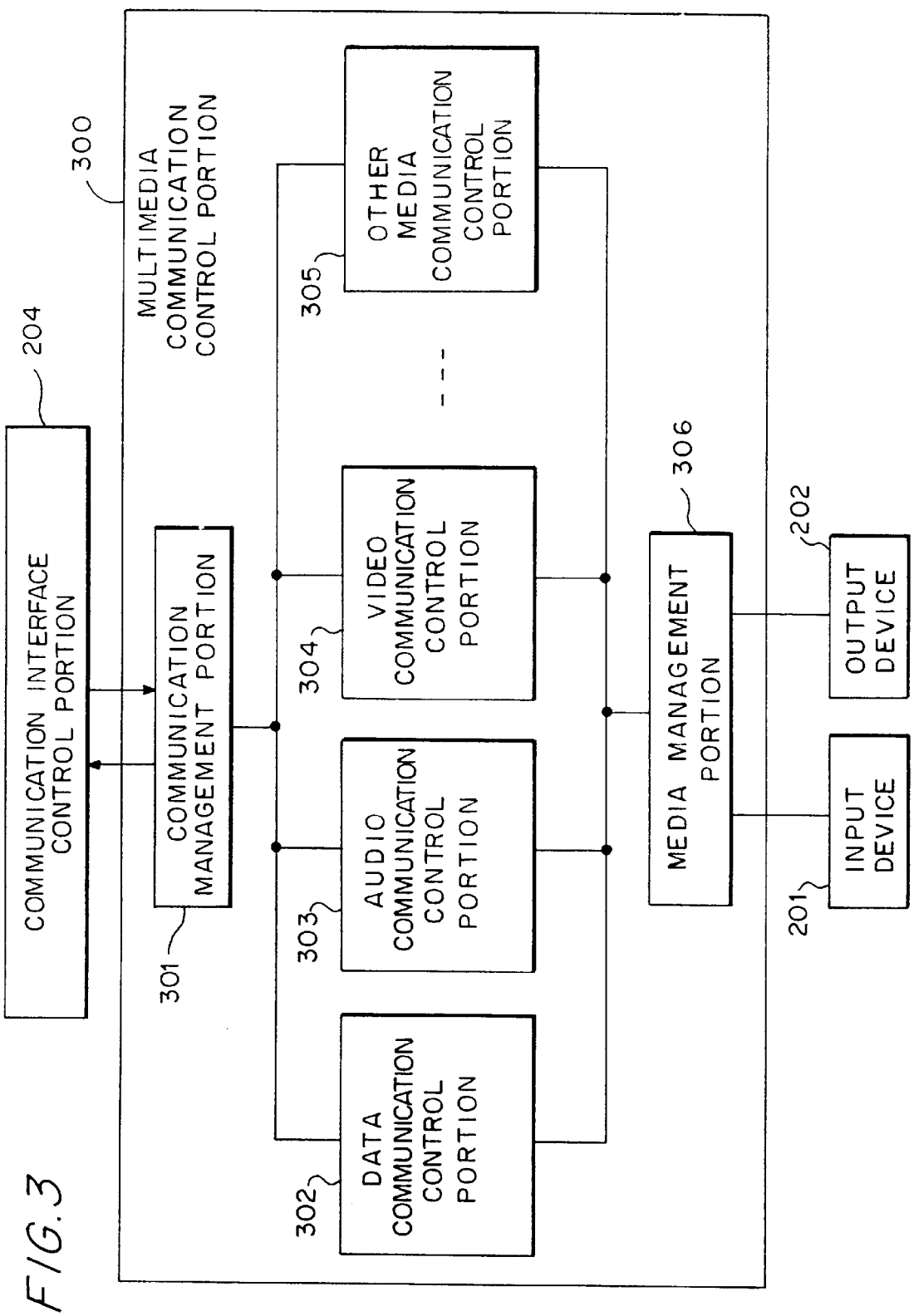
FIG. 3 is a block diagram of a communication control portion.

FIG. 3 is a block diagram showing an example of the construction of a multimedia communication control portion 300 being constituted by a communication program stored in the memory 203 shown in FIG. 2 and to be processed by the CPU 205.

In FIG. 3, 301 is a communication management portion which performs communication management such as simultaneous communication or changeover of communications from respective media, a data communication control portion, an audio communication control portion, a video communication control portion, and an other medium communication control portion to be explained later and performs input/output of data between the communication network interface control portion 204. 302 is a data communication control portion performing communication control of a data system. 303 is an audio communication control portion performing communication control of an audio system. 304 is a video communication control portion performing communication control of a video system. 305 is an other medium communication control portion performing communication control of other media for example a mail system, FAX system, etc. 306 is a media management portion performing changeover etc. of respective communication control portions such as the data communication control portion 302, the audio communication control portion 303, the video communication control portion 304, and the other medium communication control portion, and performing input/output of data between the input device 201 and the output device 202.

Figure 4:
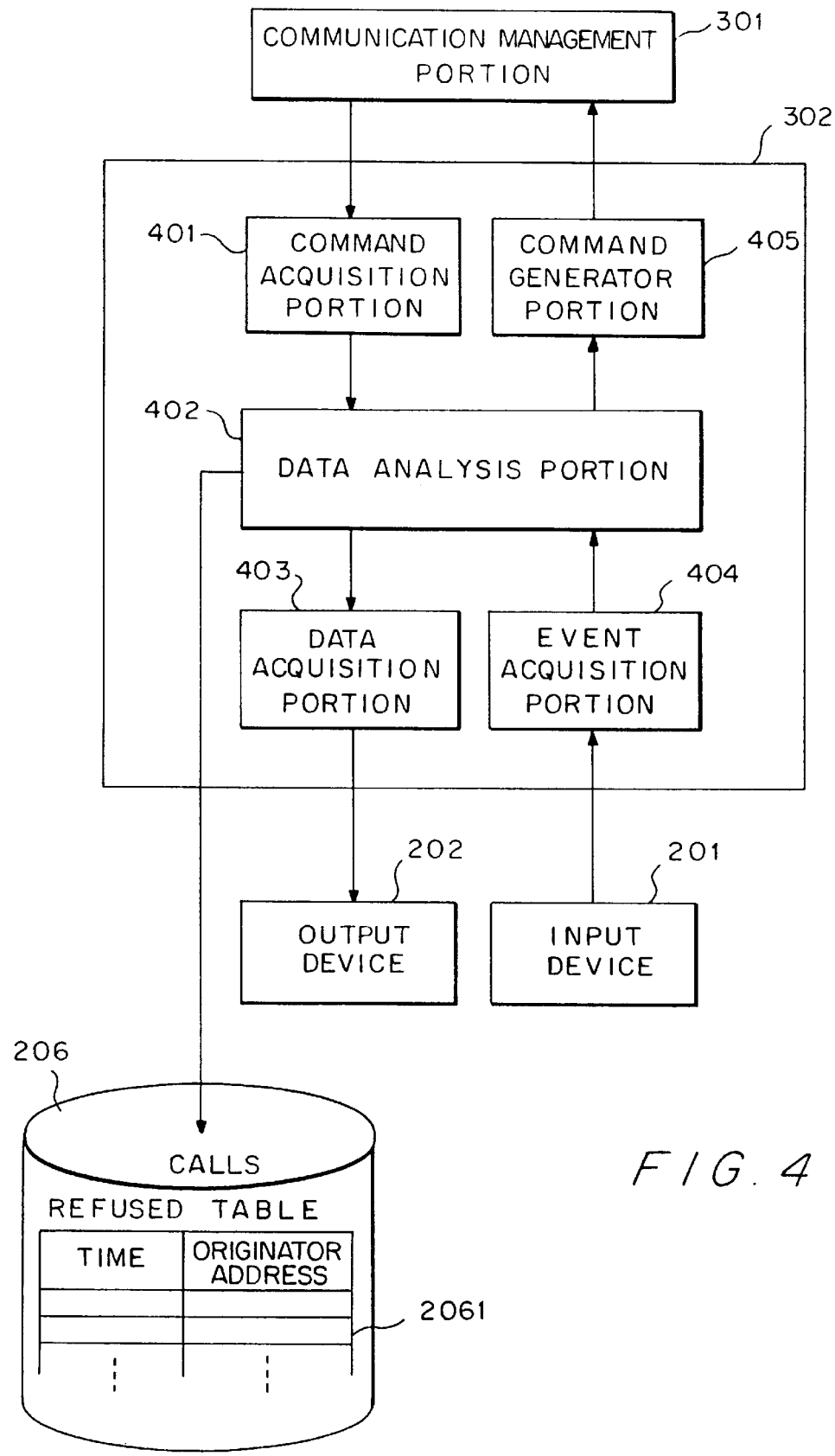
FIG. 4 is a block diagram of a data communication control portion shown in FIG. 3.

FIG. 4 is a block diagram showing an example of the construction of the data communication control portion 302. In FIG. 4, 401 is a command acquisition portion for acquiring commands and data sent from terminals to which communication is to be conducted through the communication management portion 301. 402 is a data analysis portion for analyzing data acquired in the command acquisition portion 401 or events input from users and for processing data in classifying commands and events and sending them to the proper processing routines or storage. 2061 is a calls refused table stored in the storage device 206. The information stored in the calls refused table 2061 is generated as a result of the analysis performed by the data analysis portion 402 on data acquired by the command acquisition portion 401. In the data analysis portion 402 if a communication request is to be refused information concerning the time of the communication request and the originator address of the communication request, namely the address of the communication terminal which transmitted the communication request is stored in the calls refused table 2061 of the storage device 206.

403 is a data acquisition portion. When there is data of which a user is to be informed as a result of analysis by the data analysis portion 402, the data acquisition portion 403 inputs the data and sends the data to the output portion 202.

404 is an event acquisition portion for acquiring commands or data input by a user using the input device 201. 405 is a command generator portion which sends out commands to the communication management portion 301. The communication management portion 301 acquires data from the data analysis portion 402, and communicates the data to other terminals or to the terminal itself.

Figure 5:
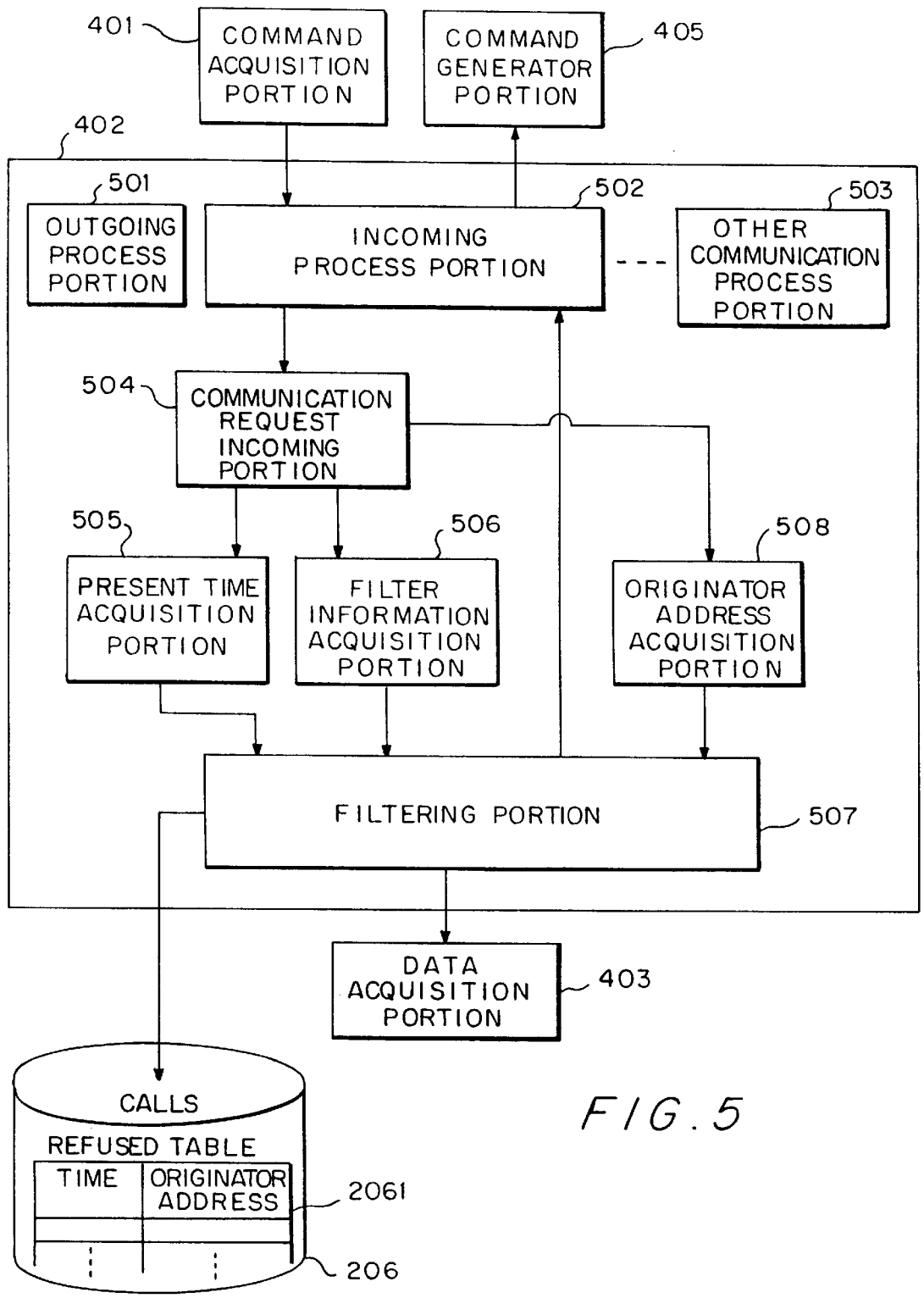
FIG. 5 is a block diagram of a data analysis portion shown in FIG. 4.

FIG. 5 is a block diagram showing an example of the construction of the data analysis portion 402. In FIG. 5, 501 is an outgoing process portion for processing outgoing communication requests. The outgoing process portion processes command and data when communication requests are issued. 502 is an incoming process portion for processing incoming communication requests. The incoming process portion accepts communication requests from others. 503 is another communication process portion for processing other communication requests other than the communication requests processed by the outgoing process portion 501 and the incoming process portion 502.

504 is a communication request incoming portion for processing a real time communication request among the data received in the incoming processing portion 502. 505 is a present time acquisition portion for acquiring a present time of an incoming communication request. 506 is a filter information acquisition portion for acquiring a refusing time zone for a real time communication request stored in the storage device 206. 508 is an originator address acquisition portion 508 for acquiring an originator address from an incoming communication request. Each communication request is a packet having a format of a fixed length string of data which includes a header having a source (originator) address and a destination address.

507 is a filtering portion for judging whether a communication request is to be accepted or not by referring to the information from the present time acquisition portion 505 and filter information acquisition portion 506. If the filtering portion 507 determines that the communication request is not to be accepted, then information concerning the time of the communication request from the present time acquisition portion 505 and the originator address from the originator address acquisition portion 508 is stored in the calls refused table 2061 stored in the storage device 206.

Figure 6:
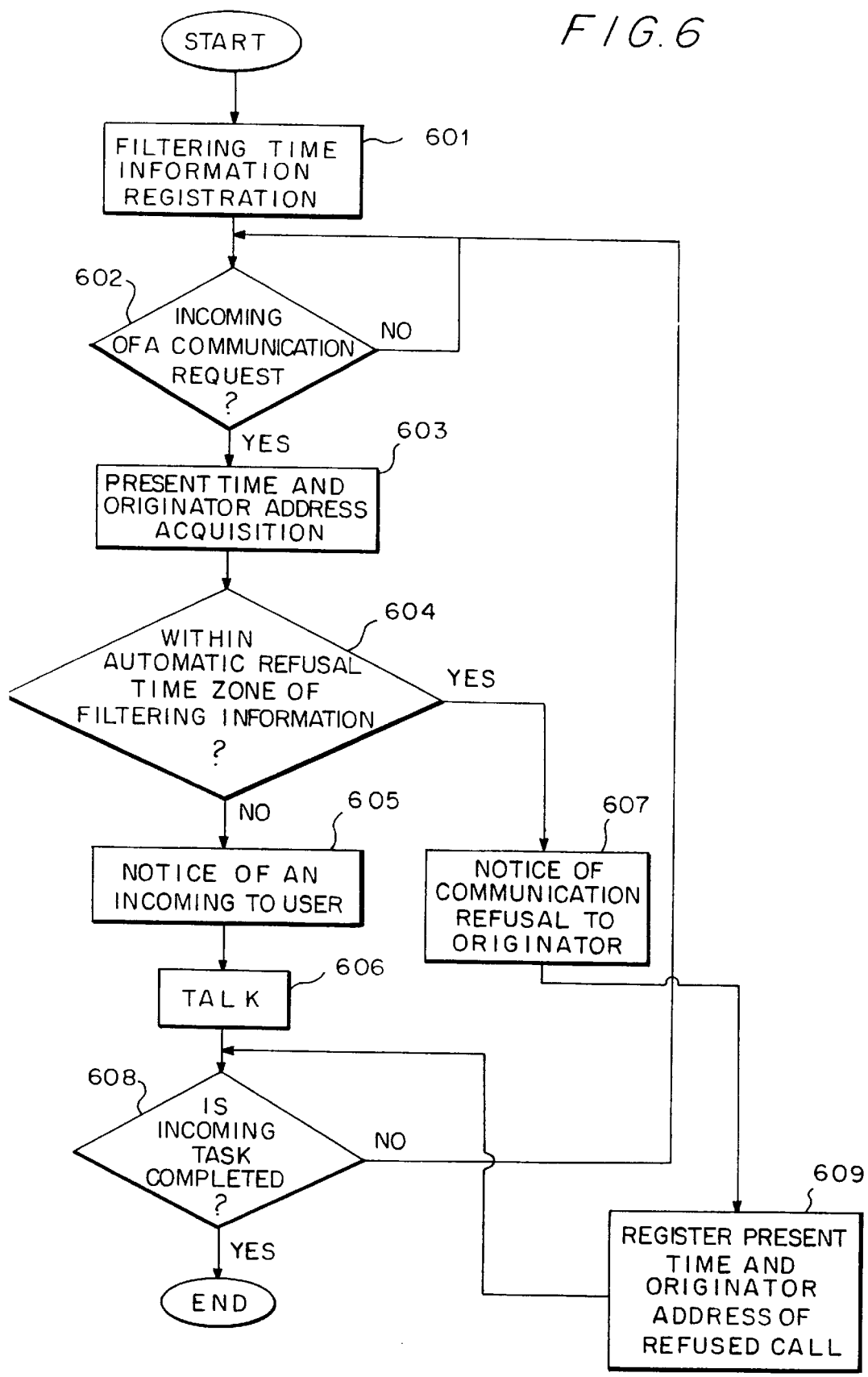
FIG. 6 is a flowchart showing a process on an incoming side in a case where automatic refusing for incoming communication requests is performed.

FIG. 6 is a flowchart showing the incoming filtering processing. After an incoming task is activated, the automatic refusing time zone (filtering time) is registered in step 601 (filter information acquisition portion 506). Thereafter, it is judged whether a real time communication request exists or not in step 602. When a real time communication request exists according to Step 602 the present time is acquired in step 603 (present time acquisition portion 505). Also, the originator address of the communication terminal that issued the communication request is acquired in step 603 (originator address acquisition portion 508).

In step 604, it is judged whether the present time is within the filtering time or not by comparing the filtering time registered in step 601 and the present time acquired in step 603 (filtering portion 507). If the present time is not within the filtering time, the communication request is accepted, and a user is informed of the incoming of a communication request. Thereafter talking is commenced in step 606.

On the other hand, if the result of the judgment in step 604, indicates that the present time is within the filtering time, the communication terminal which transmitted the communication request according to the acquired originator address is informed that the communication request is refused in step 607 (communication refusing signal issuance means included in the filter portion 507). Also, the time of the refused communication and the address of the originator of the communication request is stored for later use in step 609.

In step 608 it is judged whether a user has designated the completion of an incoming task or not. If not the process is returned to step 602. If completed the process is ended.

According to the above-described embodiment, it is possible to create a communication system in which for a communication request received in a time zone in which a real time communication request such as a talk on the telephone is automatically refused, a transmitter of the communication request is informed of the refusal without notifying the user.

Next, a second embodiment according to the present invention will be explained in detail using FIG. 7. In the second embodiment, communication requests from registered specific terminals can be accepted even when received within a filtering time.

Figure 7:
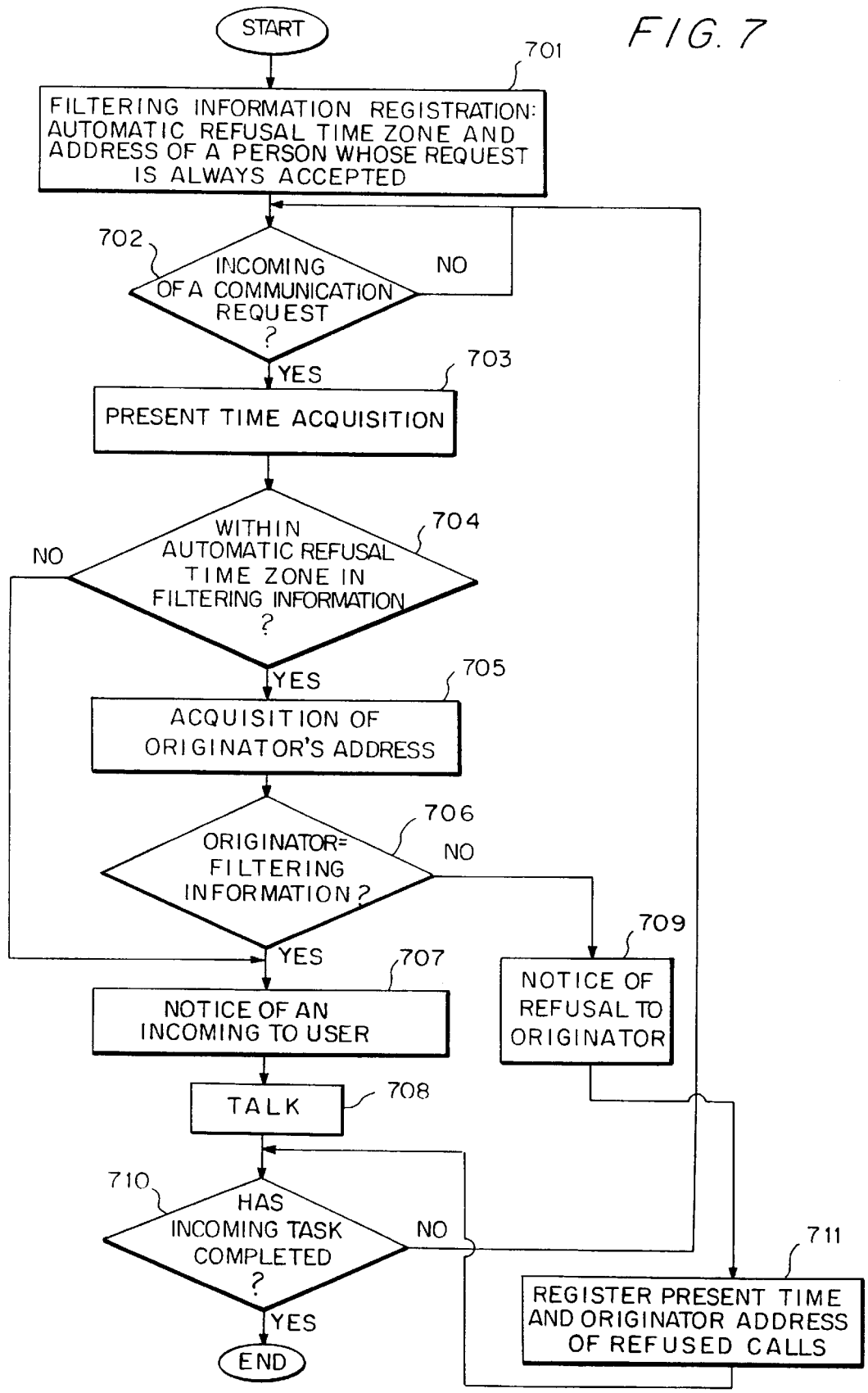
FIG. 7 is a flowchart on the incoming side for registering a person whose request is always accepted when automatic refusing for incoming communication requests is set as shown in FIG. 6.

FIG. 7 is a flowchart showing the filtering process of incoming communication requests. In step 701, in addition to the filtering time information registered in step 601 in the first embodiment, an address or addresses of person or persons whose requests are accepted even in the automatic refusing time zone are registered beforehand (communication permitted terminal registration means). Following this, the same processes as in steps 602, 603 and 604 are performed (steps 702, 703 and 704).

In the second embodiment, when a communication request is judged to have been received outside of the filtering time in step 704, the communication request is accepted, and in step 707 the user is informed of the incoming of the communication request and in step 708 talking is commenced.

On the other hand, if the present time of receipt of the communication request is within the filtering time, in step 705 the address of the transmitter of the communication request is acquired. In step 706 the address of the transmitter acquired in step 705 is compared with the addresses of persons whose requests are always accepted registered in step 701. When the address acquired in step 705 coincides with one of the addresses registered, the process is advanced to step 707 and the communication request is accepted.

On the other hand, in step 706, if the communication request is from a person not registered, the process is advanced to steps 709 and 711 and in the same way as steps 607 and 609 in the first embodiment, the transmitter is informed that its communication request has been turned down. The refusal of communication and the present time of the communication request and the address of the transmitter of the communication request is registered in the calls refused table 2061 of storage device 206.

After step 708 or step 711, in step 710 it is judged whether a user has designated the completion of an incoming task or not. If not the process is returned to step 702. If so, the present process is completed.

According to the second embodiment, it is possible to create a communication system in which a communication request received in an automatic refusing time zone from a person registered by a user as a person whose communication request can be accepted, even in a refusing time zone, the communication request is accepted and communication with the person is made possible.

Next, a third embodiment according to the present invention will be explained in detail using FIGS. 8 to 13. In the third embodiment, various kinds of registrations can be performed easily using a screen display.

Figure 8:
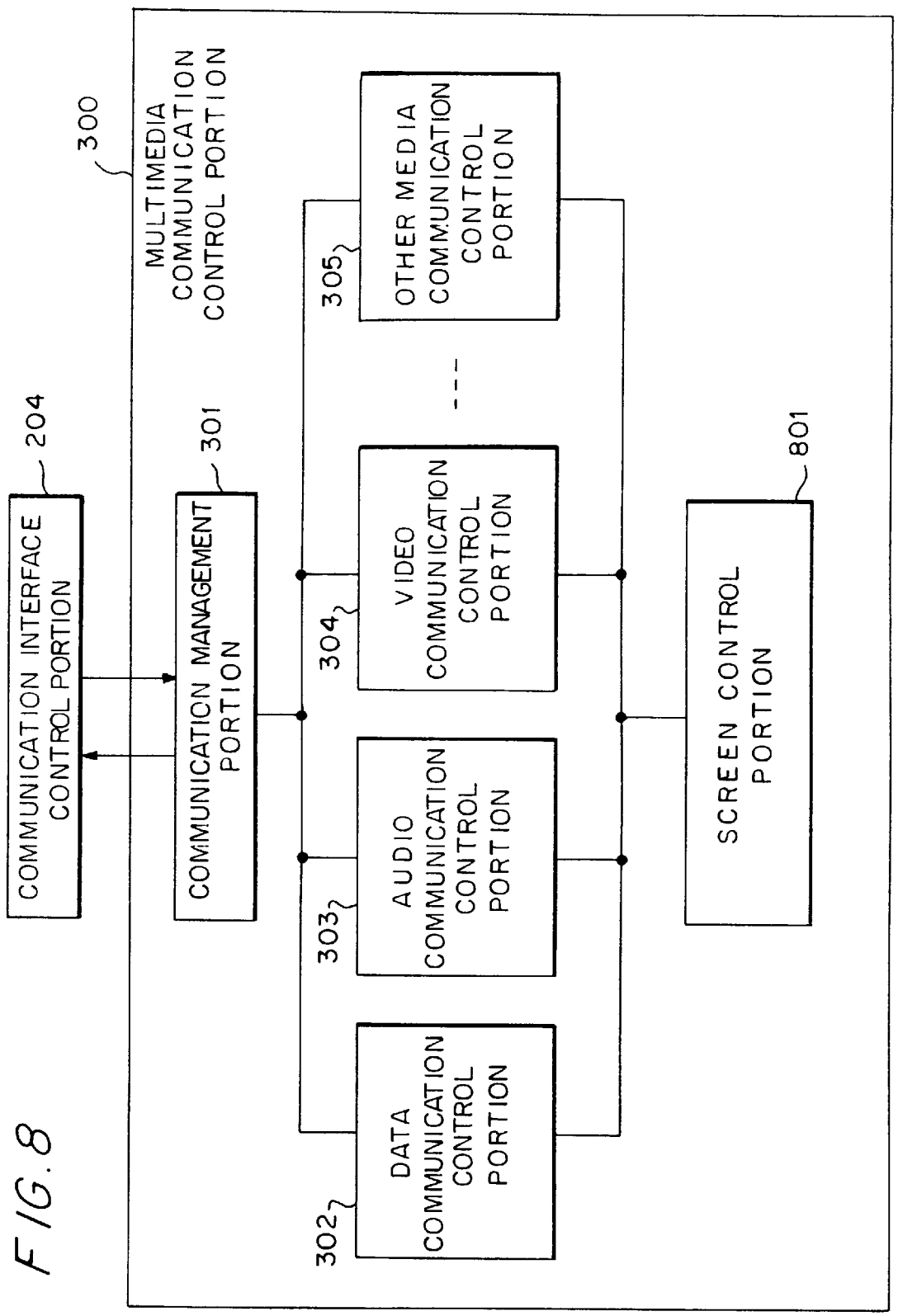
FIG. 8 is a block diagram of a communication control portion when a display screen is used as an input/output device shown in FIG. 3.

FIG. 8 is a block diagram showing an example of the construction of the multimedia communication control portion 300 described. In FIG. 8, 801 is a screen display control portion for the data to be displayed on the screen in receiving events from a user or commands and data from the data communication control portion 302, the audio communication control portion 303, the video communication control portion 304 and the other medium communication control portion 305.

Figure 9:
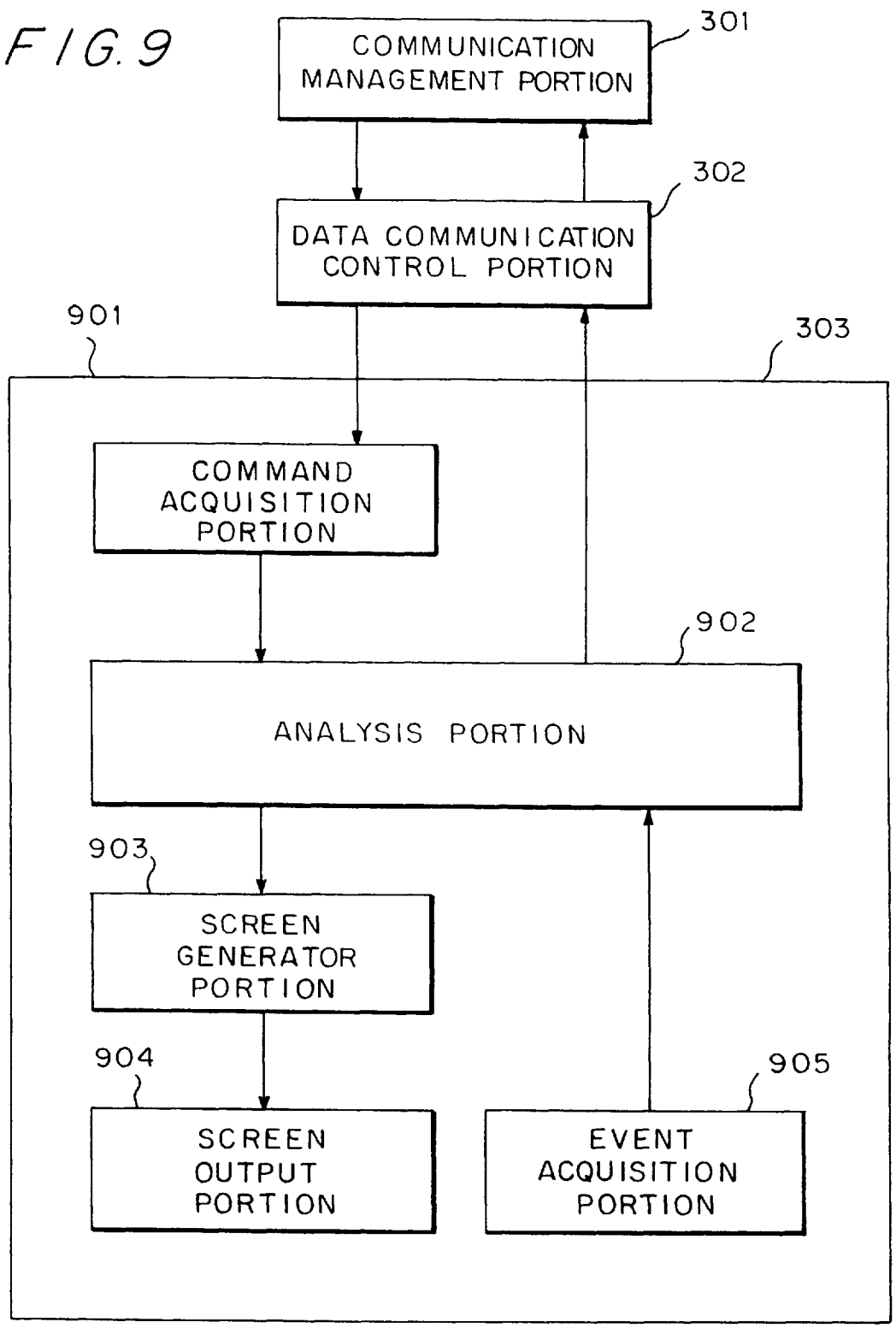
FIG. 9 is a block diagram of a screen control portion shown in FIG. 8.

FIG. 9 is a block diagram showing an example of the construction of the above-described screen display control portion 801. In FIG. 9, 901 is a command acquisition portion for acquiring a command concerning screen display as a result of analysis of a command from a terminal received by the data communication control portion 302. 902 is an analysis portion for analyzing a command acquired in the command acquisition portion 901 or an event input by a user. 903 is a screen data generator portion for displaying a screen corresponding to a command in acquiring necessary data for respective commands. 904 is a screen data output portion for outputting screen data generated in the screen data generator portion 903 to the output device 202. 905 is an event acquisition portion for acquiring an event input by a user through the input device 201.

FIG. 10 is a diagram showing a main screen of a communication system according to the present invention. In FIG. 10, 1001 is an icon for activating an outgoing task in the communication system. 1002 is an icon for activating an incoming task. 1003 and 1004 are icons for activating communication tasks other than 1001 and 1002 (a mail system, FAX system, etc.). Respective tasks are activated by clicking 1001, 1002, 1003 and 1004 with a mouse.

FIG. 11 is a diagram showing a main screen in which incoming task is displayed when an incoming task is activated by clicking the above-described icon 1002 for the incoming task, and showing an example of an icon in executing a refusal for incoming communication requests.

In FIG. 11, 1101 is a menu item for displaying an address directory privately set. The menu item 1101 can also be used for an outgoing process. A reference numeral 1102 is a menu item for displaying version information of the system, a method of a filter process, etc. A reference numeral 1103 are fields for inputting time information of automatic refusing time (filtering time information). 1104 is a field for inputting an IP address, a telephone number or a host name, when the host name of a person to communicate with is registered in the of the terminal host, of one or more persons whose communication request or communication requests can be accepted even in an automatic refusing time zone. 1105 is a filtering button for setting automatic refusing for incoming communication requests. 1106 is a button for making all communication requests accepted and informing the user of such requests without performing automatic refusing. A reference numeral 1107 is an icon showing that the present time is within a refusing time zone being displayed in some place on the screen during the time set in the filtering time information field 1103 when the filtering button 1105 is clicked.

Figure 12:
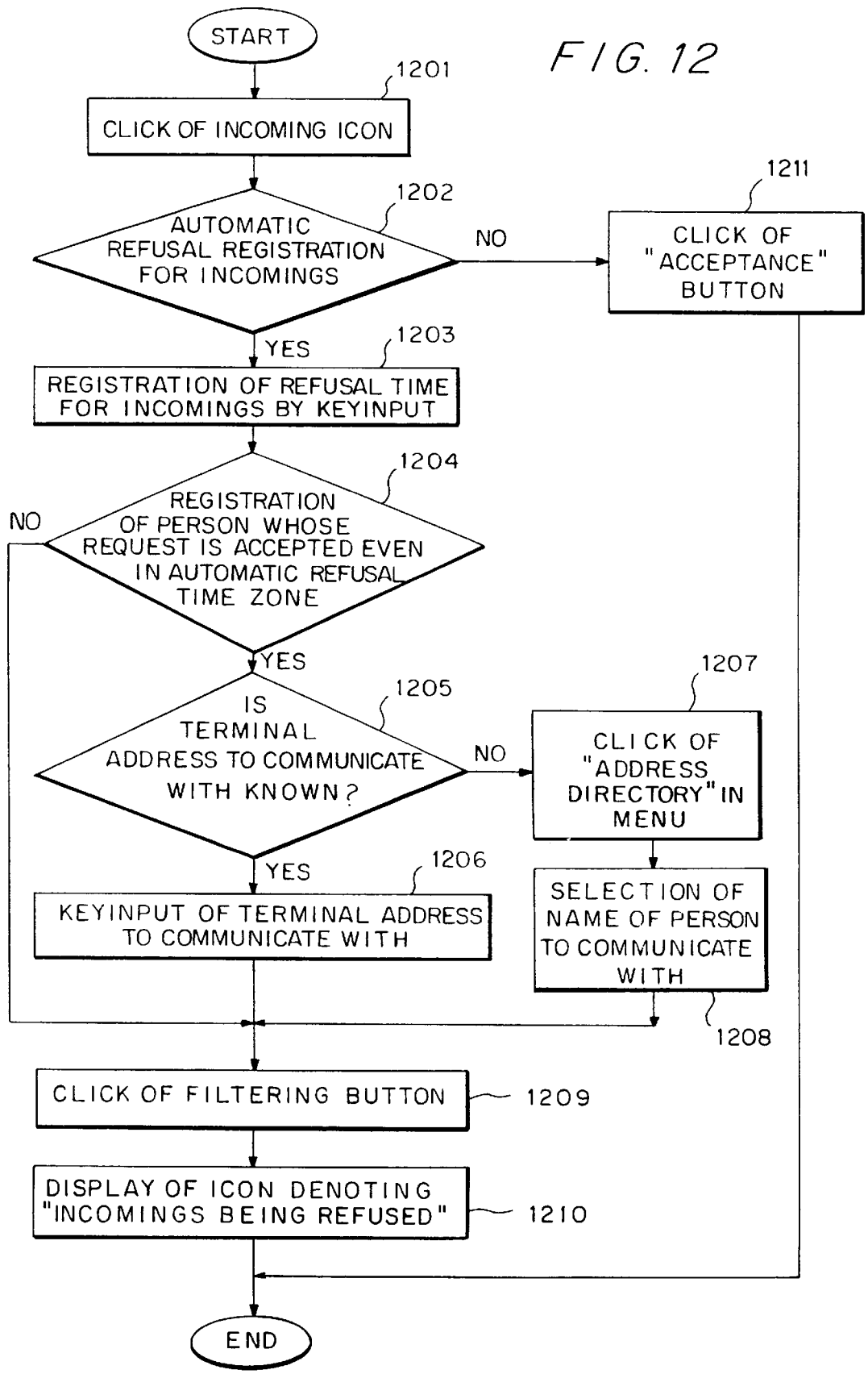
FIG. 12 is a flowchart of a filter information registration process in the display screen shown in FIG. 11.

FIG. 12 is a flowchart showing a user's interface when the filtering time information of incoming communication requests are registered. In FIG. 12, in step 1201 an incoming task is activated by clicking the incoming icon 1002. In the judgment step 1202, when automatic refusing of incoming communication requests is registered, filtering time information indicating the refusing time zone is input by a direct keyboard input in step 1203.

In the next step 1204, it is judged whether persons whose requests are accepted even in the time zone registered in step 1203 (filtering time) are to be registered or not. When it is judged that registration is to be performed and the IP address, the telephone number or the host name of the person is registered in the host in step 1205, the host name is input by keyboard in step 1206 (when the address of a terminal to communicate with is known). Alternatively, in step 1207 the icon 1101 in the address directory is clicked and in step 1208 the name of a person to talk with is selected by a mouse from the displayed address directory when the address of a terminal to communicate with is not known.

After step 1206 or step 1208, the setting of automatic refusing is completed by clicking the filtering button 1105 in step 1209. In step 1210 an icon 1107 showing the refusing of incoming communication requests is displayed and a registration process is completed.

In step 1204 when a person whose request is accepted even in a filtering time is not registered, the process is directly advanced to step 1209.

In step 1202 when automatic refusing is not registered, in step 1211 the icon 1106 is clicked and the registration process is completed.

According to the above-described embodiment, a user on the incoming side is able to set and at all times know the time at which automatic refusing continues and the time at which the communication refusing process is being executed. A user on the incoming side is able to register a person to communicate with whose communication request can be accepted even in the automatic refusing time zone by performing operations via a display screen.

Next, a fourth embodiment will be explained in detail using FIG. 13. In the fourth embodiment, in addition to the second embodiment, the reason communication requests are refused is registered as filtering information and when an incoming communication request is refused, the transmitter of the communication request is informed of the reason of refusal.

Figure 13:
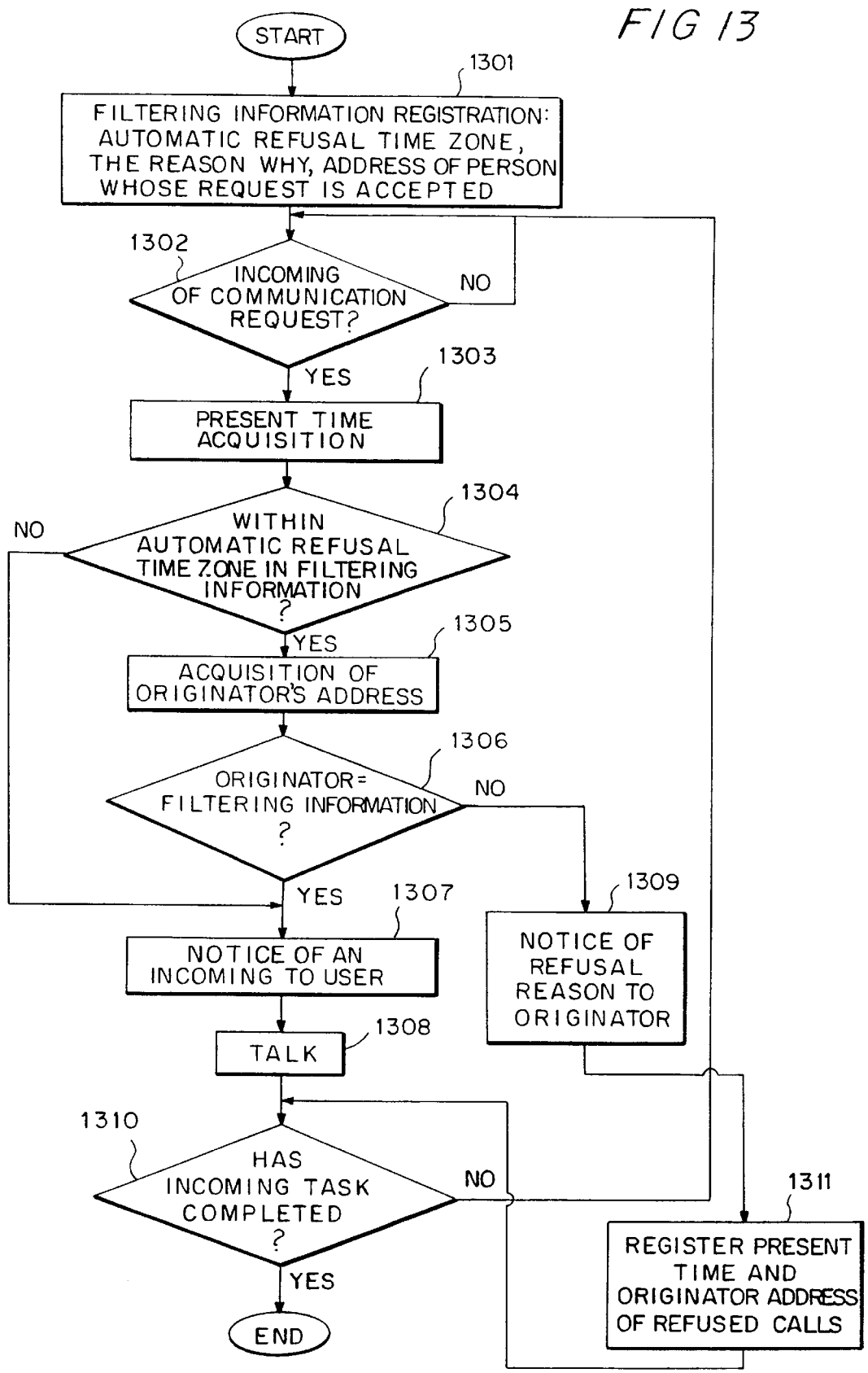
FIG. 13 is a flowchart of a process on an incoming side in a case where the reason a communication request is refused is registered in the setting of automatic refusing.

FIG. 13 is a flow chart showing the filtering process for incoming communication requests in the fourth embodiment. In step 1301, in addition to the registration of information of an automatic refusing time zone, and a person whose communication request can be always accepted even in the refusing time zone, the reason a communication request is refused (refusal reason) is also registered as filtering information for use by a refusal reason registration portion. Following the above, the same process as that in the second embodiment is performed, but when incoming communication requests are automatically refused and the refusal reason is registered in step 1301, in place of step 709, where the transmitter is informed of refusal of his request in the second embodiment, in step 1309 the communication request transmitter is informed of the refusal reason.

According to the fourth embodiment, when automatic refusing for incoming communication requests is set, the communication request transmitter is automatically informed of the refusal reason. Also in step 1311 the address of the communication transmitter and the time the communication request is refused is stored in the calls refused table 2061 of the storage device 206. Thus, according to the fourth embodiment it is possible to realize a communication system in which a transmitter is able to know the refusal reason of a receiver.

Figure 15:
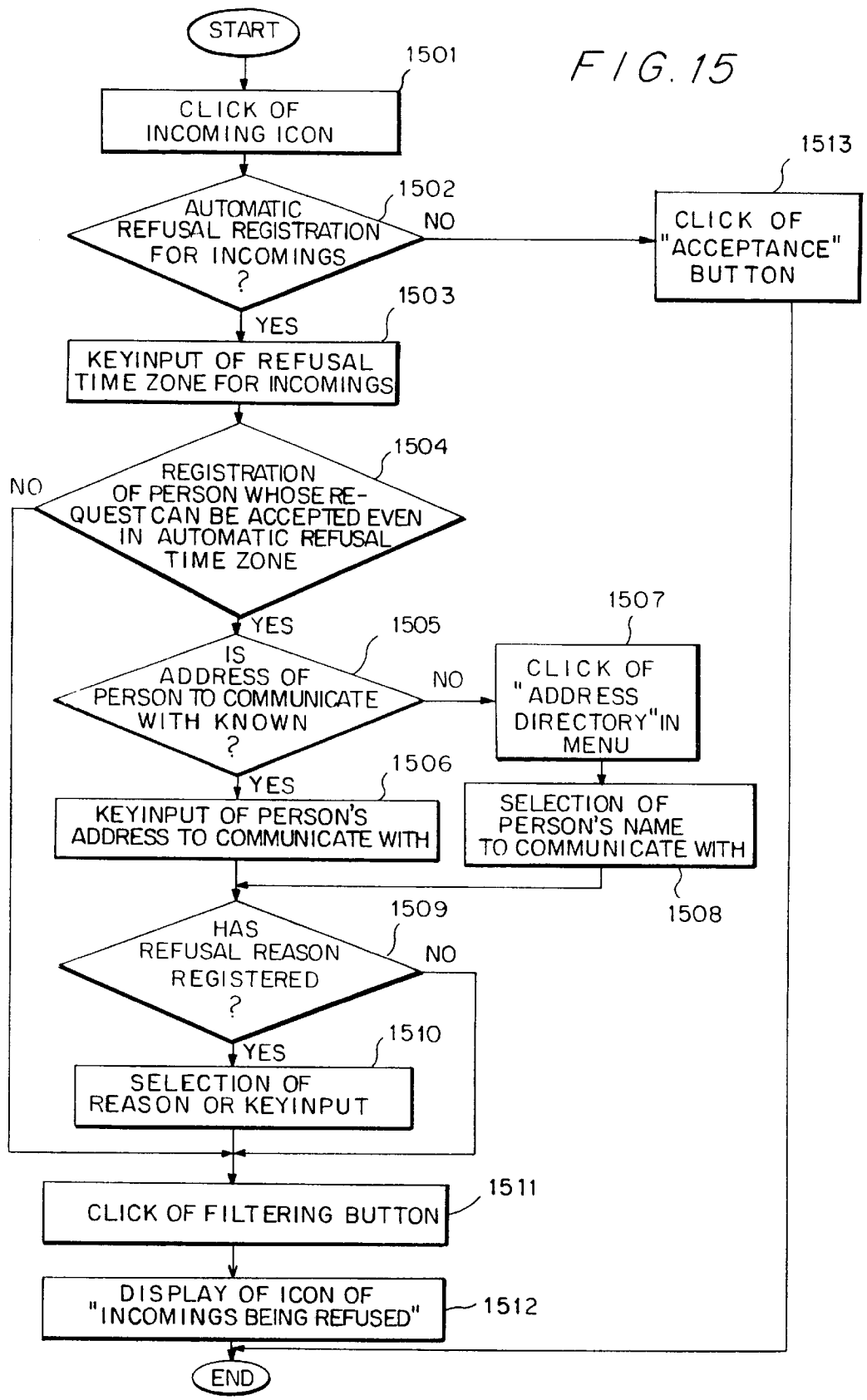
FIG. 15 is a flowchart of the filter information registration process on the display screen shown in FIG. 14.

Next, a fifth embodiment will be explained in detail using FIG. 14 and FIG. 15. In the fifth embodiment, various kinds of registrations described with respect to the fourth embodiment are facilitated by using a display screen.

FIG. 14 is a diagram showing an incoming main screen for registering a reason of refusal of communication. In FIG. 14, 1401 is a field for direct key input of a refusal reason by a user or for displaying a sentence in selecting it out of sentences registered in the system beforehand. The other fields are the same as those in the third embodiment shown in FIG. 11.

Fig, 15 is a flowchart showing a case where a reason a communication request is not accepted is registered. In FIG. 15, steps 1501 to 1508 and steps 1511 to 1513 are the same as steps 1201 to 1208 and steps 1209 to 1211 shown in FIG. 12. In the fifth embodiment, when a refusal reason is registered (step 1509, YES), in step 1502, the refusal reason is directly key input to the field 1401 or a sentence is selected out of sentences registered in the system and displayed on a screen with a scroll bar.

According to fifth embodiment, it is possible to realize a communication system in which when the system is made to refuse a communication request automatically, the refusal reason can be easily registered and the transmitter of the communication request can be informed of the refusal reason.

As a modification of the present invention it is possible to realize a communication system having such a construction that in place of providing a communication refusing time zone, some terminals are registered in the filtering information and the communication requests from these terminals are automatically refused. Thereby, a communication request from undesirable persons can be automatically refused.

Further it is possible to provide a setting portion which is able to selectively set whether a user using a communication request transmitter terminal is to be informed or not of the fact that the communication refusing signal issuance portion has issued a communication refusing signal to the communication request transmitter terminal. Thereby, a user using a communication request transmitter terminal is able to know without suspending his own work that communication requests from the communication request transmitter terminal have been refused automatically by other terminals.

In the above explanation, a packet communication network is used as a communication network and multimedia is used as information. However, this is only an example, and it will be clearly understood that the technology according to the present invention is not limited to such example.

According to the present invention, a real time communication request such as telephone communication received in an automatic refusing time zone, which is registered by an incoming side user, is refused automatically by a communication system, so that it is made possible to avoid the interruption of work being done in the registered time zone. Also, the time incoming communication request is refused and the address of the transmitter of the communication request is registered for later use by the incoming side user to for example return calls or the like.

According to the present invention, even in the registered automatic refusing time zone, a communication request from an important person can be received by registering the person as a person whose communication request is always accepted.

Further, according to the present invention, the registration of an automatic refusing time zone for incoming communication requests and the registration of a person whose communication request is always accepted can be performed easily by manipulating icons on a display screen.

According to the present invention, a communication request transmitter is able to know the reason a person to communicate with refuses his communication request by the use of registered refusal reason information in the system.

According to the present invention, a user is able to register the refusal reason for communication requests easily by manipulating icons on a display screen.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. A communication system having a plurality of communication terminals which perform data communication with each other by transmitting and receiving packets through a communication network, each communication terminal comprising:

communication management means for distributing packets acquired from said communication network;

command acquisition means for acquiring commands from said packets distributed by said communication management means;

incoming process means for accepting communication requests from among the acquired commands;

a filtering means for selecting a real time communication request from said communication requests accepted by said incoming process means; and real time communication request processing means for processing said real time communication request selected by said filtering means, wherein said real time communication request processing means comprises:

refusing time zone registration means for registering a time zone in which said communication terminal will not accept a communication request from the other communication terminals connected to said communication network, present time acquisition means for acquiring a present time when a communication request is received from a communication request transmitting terminal which is one of the other communication terminals connected to said communication network, judgment means for judging whether said communication request has been received during said time zone registered in said refusing time zone registration means by comparing said present time of said communication request acquired by said present time acquisition means to said time zone registered in said refusing time zone registration means, and communication refusing signal issuance means for issuing a communication refusing signal automatically to said communication request transmitting terminal when it is judged by said judgement means that said communication request has been received during said time zone registered in said refusing time zone registration means.

2. A communication system according to claim 1, said each communication terminal further comprising:

communication permitted terminal registration means for registering information identifying a communication terminal from which a communication request is always accepted; and means for informing a user using said communication terminal of a communication request transmitted from said communication terminal identified by said information registered in said communication permitted terminal registration means among communication requests which have been received during said time zone.

3. A communication system according to claim 2, said each communication terminal further comprising:

refusal reason registration means for registering a communication refusing reason indicating a reason said communication terminal does not accept a communication request; and means for informing said communication request transmitting terminal of said communication refusing reason, when said communication terminal refuses automatically said communication request being received during said time zone registered in said refusing time zone registration means.

4. A communication system according to claim 1, said each communication terminal further comprising:

refusal reason registration means for registering a communication refusing reason indicating a reason said communication terminal does not accept a communication request; and means for informing said communication request transmitting terminal of said communication refusing reason, when said communication terminal refuses automatically said communication request being received during said time zone registered in said refusing time zone registration means.

5. A communication system according to claim 4, said each communication terminal further comprising:

means for displaying at least an icon expressing an incoming task and a filtering button;

means for displaying an incoming filtering registration screen when activating said incoming task by a click of the icon expressing said incoming task;

input means for inputting to the incoming filtering registration display screen at least a time zone in which a communication request is not accepted, information about a communication terminal from which a communication request is always accepted even during said time zone, and a reason said communication terminal does not accept a communication request; and means for commencing filtering of incoming communication requests by a click of said filtering button and simultaneously displaying an icon denoting that said communication terminal is in said time zone for refusing incoming communication requests.

6. A communication system according to claim 5, wherein said input means provides for input to be conducted directly by keyinput or selected from a directory such as a telephone directory to be displayed on a screen being registered for private use.

7. A communication system according to claim 1, said each communication terminal further comprising:

means for displaying at least an icon expressing an incoming task and a filtering button;

means for displaying an incoming filtering registration screen when activating said incoming task by a click of the icon expressing said incoming task;

input means for inputting to the incoming filtering registration display screen at least a time zone in which a communication request is not accepted, information about a communication terminal from which a communication request is always accepted even during said time zone, and a reason said communication terminal does not accept a communication request; and means for commencing filtering of incoming communication requests by a click of said filtering button and simultaneously displaying an icon denoting that said communication terminal is in said time zone for refusing incoming communication requests.

8. A communication system according to claim 7, wherein said input means provides for input to be conducted directly by keyinput or selected from a directory such as a telephone directory to be displayed on a screen being registered for private use.

9. A communication system according to claim 1, wherein said communication request is a request for real time communication.

10. A communication system according to claim 1, said each communication terminal further comprising:

means for storing said present time acquired by said present time acquisition means and information identifying said communication request transmitting terminal when it is judged by said judgement means that said communication request is received during said time zone registered in said refusing time zone registration means.

11. A communication system according to claim 1, said each communication terminal further comprising:

setting means, settable by a user of said communication terminal, for selectively setting whether said user is to be notified when a communication refusing signal is issued by said communication refusing signal issuance means.

12. A communication system according to claim 1, wherein said communication request transmitting terminal comprises:

setting means, settable by a user of said communication request transmitting terminal, for selectively setting whether said user is to be notified when said communication refusing signal has been received indicating that said communication request has been refused.

13. A communication system having a plurality of communication terminals which perform data communication with each other by transmitting and receiving packets through a communication network, comprising:

communication management means for distributing packets acquired from said communication network;

command acquisition means for acquiring commands from said packets distributed by said communication management means;

incoming process means for accepting communication requests from among the acquired commands;

filtering means for selecting a real time communication request from said communication requests accepted by said incoming process means; and real time communication request processing means for processing said real time communication request selected by said filtering means, wherein said real time communication request processing means comprises:

communication refusing terminal registration means for registering information identifying a communication terminal which does not accept communication requests from other terminals connected to said communication network, judgment means for judging whether a communication request is for said communication terminal identified by said information registered in said communication refusing terminal registration means when said communication request is received, and communication refusing signal issuance means for issuing a communication refusing signal to a communication request transmitting terminal which transmitted said communication request when it is judged by said judgement means that said communication request for said communication terminal identified by said information registered in said communication refusing terminal registration means.

14. A communication system according to claim 13, further comprising:

communication permitted terminal registration means for registering information identifying a communication terminal from which a communication request is always accepted; and means for informing a user of a communication request transmitted from said communication terminal identified by said information registered in said communication permitted terminal registration means among communication requests which have been received.

15. A communication system according to claim 14, further comprising:

a refusal reason registration means for registering a communication refusing reason indicating a reason said communication request is not accepted; and means for informing said communication request transmitting terminal of said communication refusing reason, when said communication request has been refused.

16. A communication system according to claim 13, further comprising:

refusal reason registration means for registering a communication refusing reason indicating a reason said communication request is not accepted; and means for informing said communication request transmitting terminal of said communication refusing reason, when said communication request has been refused.

17. A communication system according to claim 16, further comprising:

means for displaying at least an icon expressing an incoming task and a filtering button;

means for displaying an incoming filtering registration screen when activating said incoming task by a click of the icon expressing said incoming task;

input means for inputting to the incoming filtering registration display screen information about a communication terminal which does not accept communication requests from other terminals, information about a communication terminal from which a communication request is always accepted and a reason a communication request is not accepted; and means for commencing filtering of incoming communication requests by a click of said filtering button and simultaneously displaying an icon denoting that said communication system is filtering incoming communication requests.

18. A communication system according to claim 17, wherein said input means provides for input to be conducted directly by keyinput or selected from a directory such as a telephone directory to be displayed on a screen being registered for private use.

19. A communication system according to claim 13, further comprising:

means for displaying at least an icon expressing an incoming task and a filtering button;

means for displaying an incoming filtering registration screen when activating said incoming task by a click of the icon expressing said incoming task;

input means for inputting to the incoming filtering registration display screen information about a communication terminal which does not accept communication requests from other terminals, information about a communication terminal from which a communication request is always accepted and a reason a communication request is not accepted; and means for commencing filtering of incoming communication requests by a click of said filtering button and simultaneously displaying an icon denoting that said communication system is filtering incoming communication requests.

20. A communication system according to claim 19, wherein said input means provides for input to be conducted directly by keyinput or selected from a directory such as a telephone directory to be displayed on a screen being registered for private use.

21. A communication system according to claim 13, wherein said communication request is a request for real time communication.

22. A communication system according to claim 13, further comprising:

means for storing a present time of receipt of said communication request acquired by present time acquisition means and information identifying said communication request transmitting terminal when it is judged by said judgement means that said communication request has been received in said communication terminal identified by said information registered in said communication refusing terminal registration means.

23. A communication system according to claim 13, further comprising:

setting means, settable by a user of said communication terminal identified by said information registered in said communication refusing terminal registration means, for selectively setting whether said user is to be notified when a communication refusing signal is issued by said communication refusing signal issuance means.

24. A communication system according to claim 13, wherein said communication request transmitting terminal comprises:

setting means, settable by a user of said communication request transmitting terminal, for selectively setting whether said user is to be notified when said communication refusing signal has been received indicating that said communication request has been refused.

25. A method performed in a communication terminal of a communication system having a plurality of communication terminals which perform data communication with each other by transmitting and receiving packets through a communication network, said method comprising the steps of:

distributing packets acquired from said communication network;

acquiring commands from said packets distributed by said distributing step;

accepting communication requests from the acquired commands;

selecting a real time communication request from among said communication requests accepted by said accepting step; and processing said real time communication request selected by said selecting step, wherein said processing step means comprises the steps of:

registering a time zone in which said communication terminal will not accept a communication request from the other communication terminals connected to said communication network, acquiring a present time when a communication request is received from a communication request transmitting terminal which is one of the other communication terminals connected to said communication network, judging whether said communication request has been received during said registered time zone by comparing said acquired present time to said registered time zone; and issuing a communication refusing signal automatically to said communication request transmitting terminal when it is judged by said judgement means that said communication request has been received during said registered time zone.

26. A method according to claim 25, further comprising the steps of:

registering information identifying a communication terminal from which a communication request is always accepted; and informing a user using said communication terminal of a communication request transmitted from said communication terminal from which a communication request is always accepted identified by said registered information among communication requests which have been received during said time zone.

27. A method according to claim 26, further comprising the steps of:

registering a communication refusing reason indicating a reason said communication terminal does not accept a communication request; and informing said communication request transmitting terminal of said communication refusing reason, when said communication terminal refuses automatically said communication request being received during said registered time zone.

28. A method according to claim 25, further comprising the steps of:

registering a communication refusing reason indicating a reason said communication terminal does not accept a communication request; and informing said communication request transmitting terminal of said communication refusing reason, when said communication terminal refuses automatically said communication request being received during said registered time zone.

29. A method according to claim 28, further comprising the steps of:

displaying at least an icon expressing an incoming task and a filtering button;

displaying an incoming filtering registration screen when activating said incoming task by a click of the icon expressing said incoming task;

inputting to the incoming filtering registration display screen at least a time zone in which a communication request is not accepted, information about a communication terminal from which a communication request is always accepted even during said time zone, and a reason said communication terminal does not accept a communication request; and commencing filtering of incoming communication requests by a click of said filtering button and simultaneously displaying an icon denoting that said communication terminal is in said time zone for refusing incoming communication requests.

30. A method according to claim 29, wherein said inputting step provides for input to be conducted directly by keyinput or selected from a directory such as a telephone directory to be displayed on a screen being registered for private use.

31. A method according to claim 25, further comprising the steps of:

displaying at least an icon expressing an incoming task and a filtering button;

displaying an incoming filtering registration screen when activating said incoming task by a click of the icon expressing said incoming task;

inputting to the incoming filtering registration display screen at least a time zone in which a communication request is not accepted, information about a communication terminal from which a communication request is always accepted even during said time zone, and a reason said communication terminal does not accept a communication request; and commencing filtering of incoming communication requests by a click of said filtering button and simultaneously displaying an icon denoting that said communication terminal is in said time zone for refusing incoming communication requests.

32. A method according to claim 31, wherein said inputting step provides for input to be conducted directly by keyinput or selected from a directory such as a telephone directory to be displayed on a screen being registered for private use.

33. A method according to claim 25, wherein said communication request is a request for real time communication.

34. A method according to claim 25, further comprising the steps of:

storing said acquired present time and information identifying said communication request transmitting terminal when it is judged that said communication request is received during said registered time zone.

35. A method according to claim 25, further comprising the steps of:

selectively setting whether said user is to be notified when a communication refusing signal is issued.

36. A method according to claim 25, further comprising the steps of:

selectively setting, in said communication request transmitting terminal, whether said user is to be notified when said communication refusing signal has been received indicating that said communication request has been refused.

37. A method in a communication system having a plurality of communication terminals which perform data communication with each other by transmitting and receiving packets through a communication network, said method comprising the steps of:

distributing packets acquired from said communication network;

acquiring commands from said packets distributed by said distributing step;

accepting communication requests from among the acquired commands;

selecting a real time communication request from said communication requests accepted by said accepting step; and processing said real time communication request selected by said selecting step, wherein said processing step comprises the steps of:

registering information identifying a communication terminal which does not accept communication requests from other terminals connected to said communication network, judging whether a communication request is for said communication terminal identified by said registered information when said communication request is received, and issuing a communication refusing signal to a communication request transmitting terminal which transmitted said communication request when it is judged that said communication request for said communication terminal identified by said registered information.

38. A method according to claim 37, further comprising the steps of:

registering communication permitted information identifying a communication terminal from which a communication request is always accepted; and informing a user of a communication request transmitted from said communication terminal identified by said registered communication permitted information among communication requests which have been received.

39. A method according to claim 38, further comprising the steps of:

registering a communication refusing reason indicating a reason said communication request is not accepted; and informing said communication request transmitting terminal of said communication refusing reason, when said communication request has been refused.

40. A method according to claim 37, further comprising the steps of:

registering a communication refusing reason indicating a reason said communication request is not accepted; and informing said communication request transmitting terminal of said communication refusing reason, when said communication request has been refused.

41. A method according to claim 40, further comprising the steps of:

displaying at least an icon expressing an incoming task and a filtering button;

displaying an incoming filtering registration screen when activating said incoming task by a click of the icon expressing said incoming task;

inputting to the incoming filtering registration display screen information about a communication terminal which does not accept communication requests from other terminals, information about a communication terminal from which a communication request is always accepted and a reason a communication request is not accepted; and commencing filtering of incoming communication requests by a click of said filtering button and simultaneously displaying an icon denoting that filtering of incoming communication requests has begun.

42. A method according to claim 41, wherein said inputting step provides for input to be conducted directly by keyinput or selected from a directory such as a telephone directory to be displayed on a screen being registered for private use.

43. A method according to claim 37, further comprising the steps of:

displaying at least an icon expressing an incoming task and a filtering button;

displaying an incoming filtering registration screen when activating said incoming task by a click of the icon expressing said incoming task;

inputting to the incoming filtering registration display screen information about a communication terminal which does not accept communication requests from other terminals, information about a communication terminal from which a communication request is always accepted and a reason a communication request is not accepted; and commencing filtering of incoming communication requests by a click of said filtering button and simultaneously displaying an icon denoting that filtering of incoming communication requests has begun.

44. A method according to claim 43, wherein said inputting step provides for input to be conducted directly by keyinput or selected from a directory such as a telephone directory to be displayed on a screen being registered for private use.

45. A method according to claim 37, wherein said communication request is a request for real time communication.

46. A method according to claim 37, further comprising the steps of:

acquiring a present time of receipt of a communication;

storing said acquired present time and information identifying said communication request transmitting terminal when it is judged that said communication request has been received in said communication terminal identified by said registered information.

47. A method according to claim 37, further comprising the steps of:

selectively setting, by a user of said communication terminal identified by said registered information, whether said user is notified when a communication refusing signal is issued.

48. A method according to claim 37, further comprising the step of:

selectively setting, by a user of said communication request transmitting terminal, whether said user is notified when said communication refusing signal has been received indicating that said communication request has been refused.

49. A computer program executed in a communication terminal of a communication system having a plurality of communication terminals which perform data communication with each other by transmitting and receiving packets through a communication network, comprising:

a computer readable medium having said computer program recorded thereon, said computer program comprises:

distributing code for causing said communication terminal to perform the function of distributing packets acquired from said communication network;

acquiring code for causing said communication terminal to perform the function of acquiring commands from said packets distributed by said distributing code;

accepting code for causing said communication terminal to perform the function of accepting communication requests from the acquired commands;

selecting code for causing said communication terminal to Perform the function of selecting a real time communication request from said communication requests accepted by said accepting code; and processing code for causing said communication terminal to perform the function of processing said real time communication request selected by said selecting step, wherein said processing code comprises the code of:
- a first code for causing said communication terminal to perform the function of registering a time zone in which said communication terminal will not accept a communication request from the other communication terminals connected to said communication network,
- a second code for causing said communication terminal to perform the function of acquiring a present time when a communication request is received from a communication request transmitting terminal which is one of the other communication terminals connected to said communication network,
- a third code for causing said communication terminal to perform the function of judging whether said communication request has been received during said registered time zone by comparing said acquired present time to said registered time zone, and
- a fourth code for causing said communication terminal to perform the function of issuing a communication refusing signal automatically to said communication request transmitting terminal when it is judged by said judgement means that said communication request has been received during said registered time zone.

50. A computer program according to claim 49, further comprising:
- a fifth code for causing said communication terminal to perform the function of registering information identifying a communication terminal from which a communication request is always accepted; and
- a sixth code for causing said communication terminal to perform the function of informing a user using said communication terminal of a communication request transmitted from said communication terminal from which a communication request is always accepted identified by said registered information among communication requests which have been received during said time zone.

51. A computer program according to claim 50, further comprising:
- a seventh code for causing said communication terminal to perform the function of registering a communication refusing reason indicating a reason said communication terminal does not accept a communication request; and
- an eighth code for causing said communication terminal to perform the function of informing said communication request transmitting terminal of said communication refusing reason, when said communication terminal refuses automatically said communication request being received during said registered time zone.

52. A computer program according to claim 49, further comprising:
- a fifth code for causing said communication terminal to perform the function of registering a communication refusing reason indicating a reason said communication terminal does not accept a communication request; and
- a sixth code for causing said communication terminal to perform the function of informing said communication request transmitting terminal of said communication refusing reason, when said communication terminal refuses automatically said communication request being received during said registered time zone.

53. A computer program according to claim 52, further comprising:
- a seventh code for causing said communication terminal to perform the function of displaying at least an icon expressing an incoming task and a filtering button;
- an eighth code for causing said communication terminal to perform the function of displaying an incoming filtering registration screen when activating said incoming task by a click of the icon expressing said incoming task;
- a ninth code for causing said communication terminal to perform the function of inputting to the incoming filtering registration display screen at least a time zone in which a communication request is not accepted, information about a communication terminal from which a communication request is always accepted even during said time zone, and a reason said communication terminal does not accept a communication request; and
- a tenth code for causing said communication terminal to perform the function of commencing filtering of incoming communication requests by a click of said filtering button and simultaneously displaying an icon denoting that said communication terminal is in said time zone for refusing incoming communication requests.

54. A computer program according to claim 53, wherein said seventh code provides for input to be conducted directly by keyinput or selected from a directory such as a telephone directory to be displayed on a screen being registered for private use.

55. A method according to claim 49, further comprising:
- a fifth code for causing said communication terminal to perform the function of displaying at least an icon expressing an incoming task and a filtering button;
- a sixth code for causing said communication terminal to perform the function of displaying an incoming filtering registration screen when activating said incoming task by a click of the icon expressing said incoming task;
- a seventh code for causing said communication terminal to perform the function of inputting to the incoming filtering registration display screen at least a time zone in which a communication request is not accepted, information about a communication terminal from which a communication request is always accepted even during said time zone, and a reason said communication terminal does not accept a communication request; and
- an eighth code for causing said communication terminal to perform the function of commencing filtering of incoming communication requests by a click of said filtering button and simultaneously displaying an icon denoting that said communication terminal is in said time zone for refusing incoming communication requests.

56. A computer program according to claim 55, wherein said seventh code provides for input to be conducted directly by keyinput or selected from a directory such as a telephone directory to be displayed on a screen being registered for private use.

57. A computer program according to claim 49, wherein said communication request is a request for real time communication.

58. A computer program according to claim 49, further comprising:
   a fifth code for causing said communication terminal to perform the function of storing said acquired present time and information identifying said communication request transmitting terminal when it is judged that said communication request is received during said registered time zone.

59. A computer program according to claim 49, further comprising the steps of:
   a fifth code for causing said communication terminal to perform the function of selectively setting whether said user is to be notified when a communication refusing signal is issued.

60. A computer program according to claim 49, further comprising:
   a fifth code for causing said communication terminal to perform the function of selectively setting, in said communication request transmitting terminal, whether said user is to be notified when said communication refusing signal has been received indicating that said communication request has been refused.

61. A computer program executed in a communication system having a plurality of communication terminals which perform data communication with each other by transmitting and receiving packets through a communication network, comprising:
   a computer readable medium having said computing program recorded thereon, said computer program comprises:
      distributing code for causing said communication terminal to perform the function of distributing packets acquired from said communication network;
      acquiring code for causing said communication terminal to perform the function of acquiring commands from said packets distributed by said distributing code;
      accepting code for causing said communication terminal to perform the function of accepting communication requests from the acquired commands;
      selecting code for causing said communication terminal to perform the function of selecting a real time communication request from said communication requests accepted by said accepting code; and
      processing code for causing said communication terminal to perform the function of processing said real time communication request selected by said selecting step,
      wherein said processing code comprises the code of:
         a first code for causing said communication system to perform the function of registering information identifying a communication terminal which does not accept communication requests from other terminals connected to said communication network,
         a second code for causing said communication system to perform the function of judging whether a communication request is for said communication terminal identified by said registered information when said communication request is received, and
         a third code for causing said communication system to perform the function of issuing a communication refusing signal to a communication request transmitting terminal which transmitted said communication request when it is judged that said communication request for said communication terminal identified by said registered information.

62. A computer program according to claim 61, further comprising:
   a fourth code for causing said communication system to perform the function of registering communication permitted information identifying a communication terminal from which a communication request is always accepted; and
   a fifth code for causing said communication system to perform the function of informing a user of a communication request transmitted from said communication terminal identified by said registered communication permitted information among communication requests which have been received.

63. A computer program according to claim 62, further comprising:
   a sixth code for causing said communication system to perform the function of registering a communication refusing reason indicating a reason said communication request is not accepted; and
   a seventh code for causing said communication system to perform the function of informing said communication request transmitting terminal of said communication refusing reason, when said communication request has been refused.

64. A computer program according to claim 61, further comprising:
   a fourth code for causing said communication system to perform the function of registering a communication refusing reason indicating a reason said communication request is not accepted; and
   a fifth code for causing said communication system to perform the function of informing said communication request transmitting terminal of said communication refusing reason, when said communication request has been refused.

65. A computer program according to claim 64, further comprising the steps of:
   a sixth code for causing said communication system to perform the function of displaying at least an icon expressing an incoming task and a filtering button;
   a seventh code for causing said communication system to perform the function of displaying an incoming filtering registration screen when activating said incoming task by a click of the icon expressing said incoming task;
   an eighth code for causing said communication system to perform the function of inputting to the incoming filtering registration display screen information about a communication terminal which does not accept communication requests from other terminals, information about a communication terminal from which a communication request is always accepted and a reason a communication request is not accepted; and
   a ninth code for causing said communication system to perform the function of commencing filtering of incoming communication requests by a click of said filtering button and simultaneously displaying an icon denoting that filtering of incoming communication requests has begun.

66. A computer program according to claim 65, wherein said eighth code provides for input to be conducted directly by keyinput or selected from a directory such as a telephone directory to be displayed on a screen being registered for private use.

67. A computer program according to claim 61, further comprising:
- a fourth code for causing said communication system to perform the function of displaying at least an icon expressing an incoming task and a filtering button;
- a fifth code for causing said communication system to perform the function of displaying an incoming filtering registration screen when activating said incoming task by a click of the icon expressing said incoming task;
- a sixth code for causing said communication system to perform the function of inputting to the incoming filtering registration display screen information about a communication terminal which does not accept communication requests from other terminals, information about a communication terminal from which a communication request is always accepted and a reason a communication request is not accepted; and
- a seventh code for causing said communication system to perform the function of commencing filtering of incoming communication requests by a click of said filtering button and simultaneously displaying an icon denoting that filtering of incoming communication requests has begun.

68. A computer program according to claim 67, wherein said sixth code provides for input to be conducted directly by keyinput or selected from a directory such as a telephone directory to be displayed on a screen being registered for private use.

69. A computer program according to claim 61, wherein said communication request is a request for real time communication.

70. A computer program according to claim 61, further comprising:
- a fourth code for causing said communication system to perform the function of acquiring a present time of receipt of a communication;
- a fifth code for causing said communication system to perform the function of storing said acquired present time and information identifying said communication request transmitting terminal when it is judged that said communication request has been received in said communication terminal identified by said registered information.

71. A computer program according to claim 61, further comprising:
- a fourth code for causing said communication system to perform the function of selectively setting, by a user of said communication terminal identified by said registered information, whether said user is notified when a communication refusing signal is issued.

72. A computer program according to claim 61, further comprising:
- a fourth code for causing said communication system to perform the function of selectively setting, by a user of said communication request transmitting terminal, whether said user is notified when said communication refusing signal has been received indicating that said communication request has been refused.

* * * * *